Warner & Gaylord,
Spear Grapple,
Nº 7,709. Patented Oct. 8, 1850.
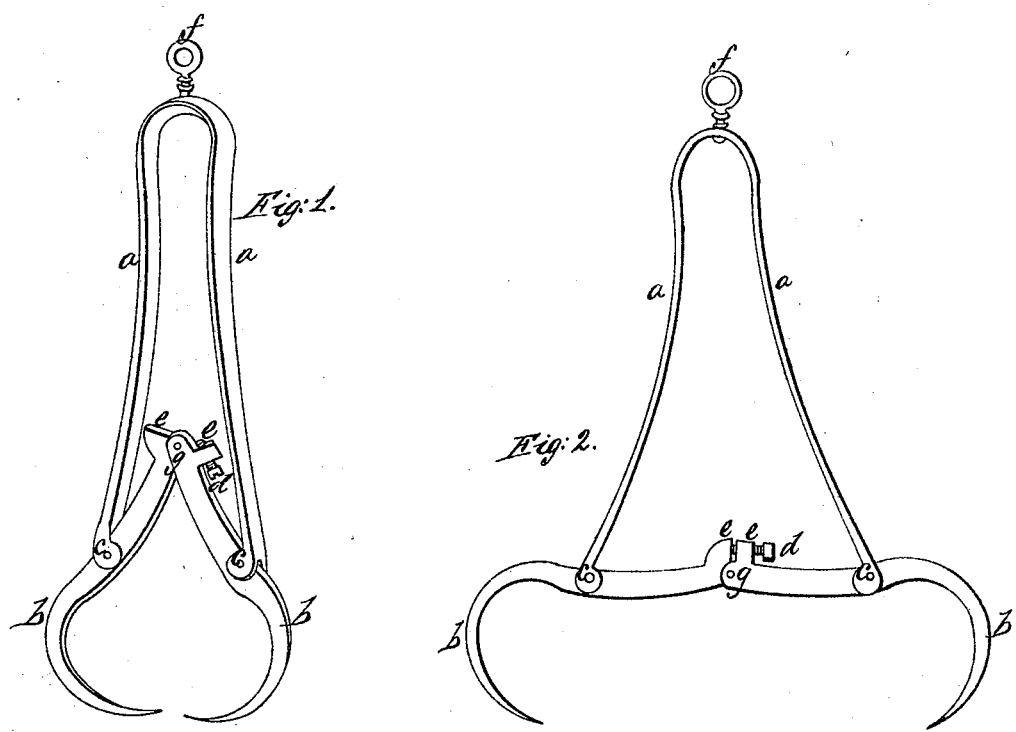

UNITED STATES PATENT OFFICE.

O. WARNER AND CHAS. S. GAYLORD, OF GAYLORD'S BRIDGE, CONN.

IMPROVED SPRING-GRAPPLE.

Specification forming part of Letters Patent No. 7,709, dated October 8, 1850.

*To all whom it may concern:*

Be it known that we, ORRA WARNER and CHARLES S. GAYLORD, both of Gaylord's Bridge, in Litchfield county and State of Connecticut, have invented a new and improved mode of constructing an instrument called a "grapple," to be used for the purpose of catching fish, animals, and for other purposes; and we do hereby declare that the following is a full, clear, and exact description of the construction and operation of the same, reference being had to the annexed drawings, making a part of this specification, in which—

Figure 1 is a perspective view of the entire instrument shut together or unset, and Fig. 2 a front view of the same represented open or set.

The nature of our invention consists of a metallic spring of more or less length and thickness, according to the size of the object to be seized, bent so as to resemble in its outlines a pair of sugar-tongs. Each end of the spring has an ear, in which a slot or mortise is cut open at the end. In each of these mortises is inserted a metallic hook, resembling in form an eagle's talon, and the hook is fastened therein by a pin or rivet passing through both the ear and hook, on which pin as an axis the hook is allowed to move freely. (See Figs. 1 and 2 of the drawings, wherein like letters refer to like parts in both figures.)

*a a* represent the springs; *b b*, the hooks; *c c*, the pins or axes of the hooks. The inner or upper ends of the hooks are provided one with a tenon and shoulder and the other with a mortise and shoulder, and are fastened together with a pin or rivet, which serves as an axis for both hooks. In one of the shoulders aforesaid is inserted a set-screw, which passes through the shoulder. (See both figures.)

*e e* are the shoulders, *d* the set-screw, and *g* the axis. When the points of the hooks are forced apart far enough to bring the three axes above described nearly in a right line the set-screw in the shoulder of one hook touches the shoulder of the other, thus making a set joint, and the instrument remains open or set ready for use. In the short bend of the spring is inserted a swivel for the convenience of attaching a line, wire, or pole to the instrument. (See both figures.) *f*, the swivel.

To use the above-described instrument it is, when fastened to a line, wire, or pole, opened and then lowered onto the object desired. As soon as the set joint touches the object the joint yields and the force of the spring brings the points of the hooks forcibly together. The set-screw causes the grapple to spring more or less easily, according as the joint is made more or less open thereby.

Having thus fully described our invention, we will now proceed to state what we claim as our invention, and desire to secure by Letters Patent; but we would first say that we are aware that spring hooks or talons and a set joint have heretofore been employed as a trap, for which device Letters Patent were granted to Thos. A. Davies in 1849; but his arrangement involves the use of a trigger to operate the joint. Our arrangement simplifies the trap in other respects and does away with the use of a trigger.

What we claim, therefore, is—

Not a set joint, but the arrangement of the tongs-shaped springs, talons, and set joint, constructed and acting as herein described.

ORRA WARNER.
CHARLES S. GAYLORD.

Witnesses:
GEORGE W. MARSH,
JOHN TAYLOR.